United States Patent
Deeke

[15] 3,700,381
[45] Oct. 24, 1972

[54] COUPLING ASSEMBLY

[72] Inventor: Heinrich E. Deeke, Los Angeles, Calif.

[73] Assignee: National Tool & Die Corporation, Huntington Park, Calif.

[22] Filed: Dec. 21, 1970

[21] Appl. No.: 100,013

[52] U.S. Cl. .................................................... 4/288
[51] Int. Cl. ........................... E03c 1/20, E03c 1/26
[58] Field of Search .......... 4/190, 191, 195, 286, 288, 4/290, 292; 285/42, 158, 161, 391, DIG. 22

[56] References Cited

UNITED STATES PATENTS

| | | | |
|---|---|---|---|
| 2,091,927 | 8/1937 | Hirshstein | 285/42 X |
| 3,281,869 | 11/1966 | Schweigaard-Olsen et al | 4/288 |
| 2,278,566 | 4/1942 | Schaible | 4/288 UX |
| 1,890,348 | 12/1932 | Weatherhead | 285/161 X |
| 674,389 | 5/1901 | Volkmar | 4/285 |
| 838,702 | 12/1906 | Ficener | 4/288 |
| 1,008,400 | 11/1911 | Wise | 4/288 |
| 3,509,586 | 5/1970 | Politz | 4/286 X |
| 3,583,003 | 6/1971 | Thompson | 4/191 |

*Primary Examiner*—Frederick L. Matteson
*Assistant Examiner*—Donald B. Massenberg
*Attorney*—Christie, Parker & Hale

[57] ABSTRACT

A coupling assembly includes a sleeve having an upper portion mounted in an opening in a floor or tank and a lower portion below the opening disposed around the outer surface of a conduit. An outer lock ring clamps the lower portion of the sleeve in a rigid position in the opening. The inner surface of the sleeve's lower portion is spaced laterally from the outer surface of the conduit to form an annular space between the sleeve and conduit for receiving a deformable gasket. Vertically spaced apart serrations are formed on the inner surface of the sleeve's lower portion, and an inner lock ring having an outwardly projecting shoulder is driven down into the annular space so it presses against the upper surface of the gasket to squeeze the gasket so it clamps and seals the lower portion of the sleeve to the outer surface of the conduit. The shoulder on the inner lock ring is engaged between a pair of the serrations to maintain the gasket clamped and sealed between the sleeve and conduit.

12 Claims, 3 Drawing Figures

INVENTOR.
HEINRICH E. DEEKE

BY
Christie, Parker & Hale
ATTORNEYS

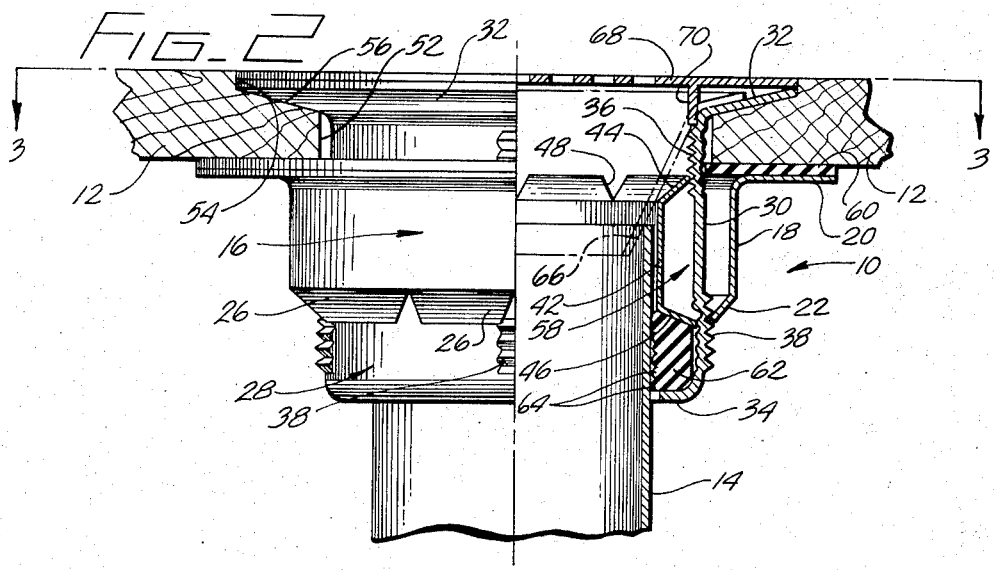
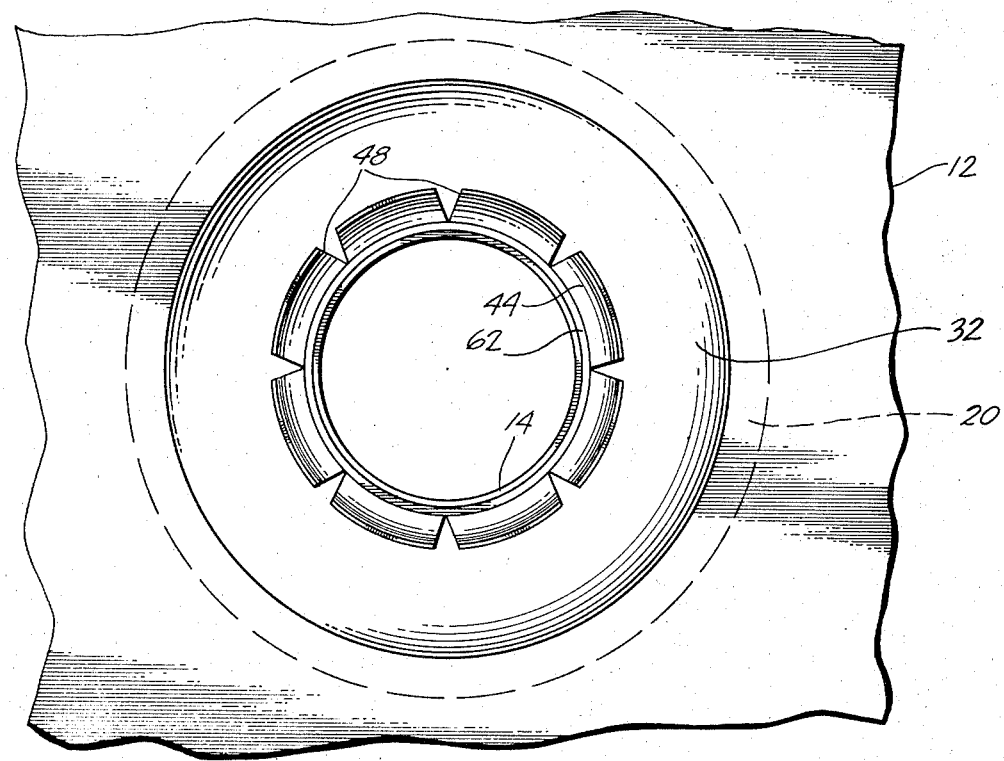

COUPLING ASSEMBLY

BACKGROUND OF THE INVENTION

1. Field of the Invention

This invention relates to an easily assemblable coupling for joining a pipe to a base, and more particularly to a coupling assembly having no bolted or screw threaded parts which, in a typical application, permits a quick and easy coupling between a drain floor, vessel, or the like and a standpipe, tube, or hose.

2. Description of the Prior Art

Pipe fittings for coupling between a base and a pipe generally have mating screw threaded pipe joints. Caulking compound is often applied to seal the threaded pipe joint. Such pipe fittings commonly use fasteners, such as screws, to maintain mating portions of the fitting in a fixed position.

SUMMARY OF THE INVENTION

This invention provides a simple coupling assembly in which no screw threaded parts or separate fasteners are used. The coupling is easily assembled in a fluid-tight snapping fit, thereby eliminating the need for threaded pipes, threaded pipe fittings, special tools such as wrenches, and the time to screw the assembly together.

Briefly, the coupling comprises a tubular member disposed adjacent to a conduit so as to form a space between a wall portion of the tubular member and the surface of the conduit. A deformable gasket is mounted in the lower portion of the space. A locking member mounted in the space engages lock receiving means in the space so the locking member exerts a force against the gasket to squeeze it so it forms a fluid-tight seal between the tubular member and the conduit and tightly clamps the tubular member to the conduit.

In a preferred form of the invention, the tubular member is disposed around the outside of the standpipe so an annular space is formed between the inner wall of the tubular member and the outer surface of the conduit. Preferably, the lock receiving means comprises vertically spaced apart serrations formed on the inner wall of the tubular member. The locking member preferably includes a ring-shaped sleeve with an outwardly projecting shoulder which engages the serrations in a snapping fit to maintain the lock ring tightly clamped against the gasket.

In a typical application of the coupling assembly, the tubular member is mounted in an opening in a base, such as a drain floor of a bath tub, shower, or the like, with a lower portion of the tubular member extending below the lower surface of the base. Clamping means, such as a sleeve having an inwardly projecting shoulder, is disposed around the lower portion of the tubular member, with its upper end held tightly against the lower surface of the base. Preferably, vertically spaced apart serrations are formed on the outer surface of the tubular member's lower portion, and the shoulder of the clamping means cooperates with the serrations in a snapping fit to tightly clamp the tubular member in the opening of the base.

BRIEF DESCRIPTION OF THE DRAWINGS

These and other aspects of the invention are more fully set forth in the following detailed description of the embodiment of the invention which is presently preferred, such description being presented in accordance with the accompanying drawings, in which:

FIG. 2 is a fragmentary elevation, partly in section, of the coupling assembly joining a base and a standpipe; and FIG. 3 is a plan elevation taken on line 3—3 of FIG. 2.

DETAILED DESCRIPTION OF THE PREFERRED EMBODIMENT

Figure 1:
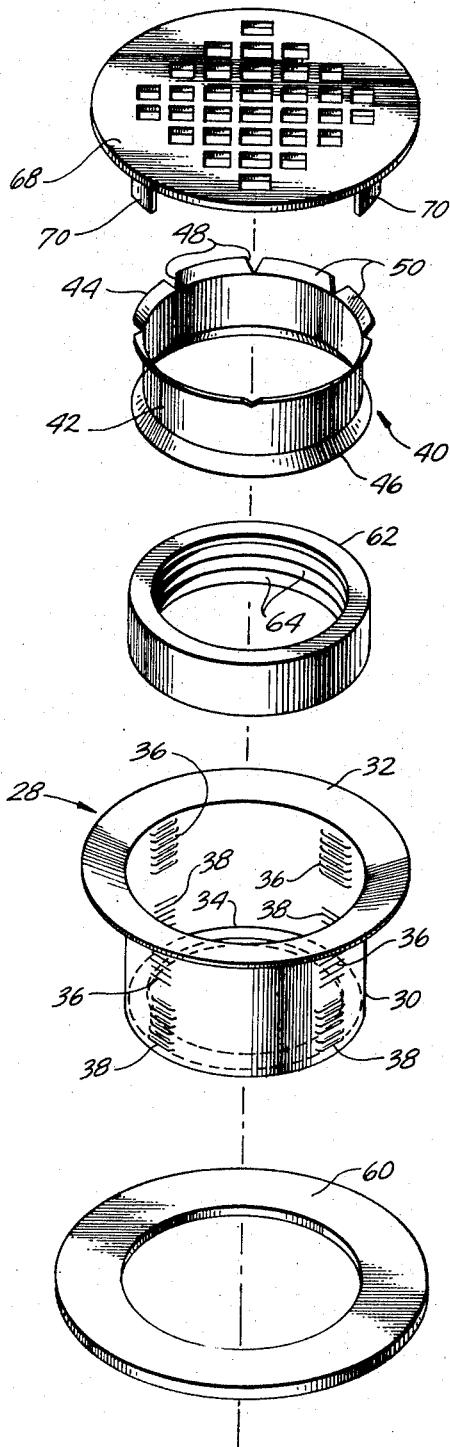
FIG. 1 is an exploded perspective view of a coupling assembly.
Figure 1:
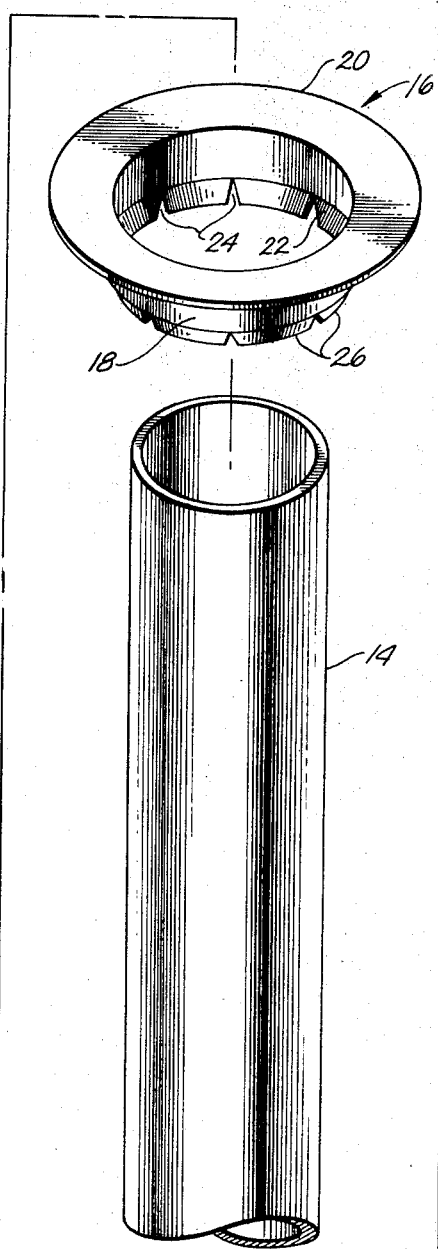

Referring to the drawings, a coupling assembly 10 joins a base 12 and a standpipe 14. The coupling assembly includes a clamping member or outer lock ring 16 comprising a relatively thin circular sleeve portion 18 with an outwardly projecting flange 20 at its top and a downwardly and inwardly inclined rim 22 at its bottom. A plurality of spaced apart V-shaped notches 24 are formed in rim 22 to define downwardly and inwardly projecting fingers 26 at the bottom of the outer lock ring. The outer lock ring is preferably made of aluminum or steel material, such as stainless steel, so that the fingers 26 have a slight resiliency.

Coupling assembly 10 also includes a sleeve 28 having a relatively thin tubular intermediate portion 30 with an outwardly projecting flange 32 at its top and an inwardly projecting rim 34 at its bottom. As shown best in FIG. 2, sleeve 28 is sized to fit over standpipe 14 so that the inner periphery of rim 34 is closely spaced from the outer surface of the standpipe. Columns of vertically paced apart serrations 36 are laterally spaced apart around the upper portion of the circumference of tubular portion 30. Preferably, there are four columns of serrations 36 spaced equidistantly apart around tubular portion 30, although more columns of serrations may be provided if desired. Similarly, columns of vertically spaced apart serrations 38 are laterally spaced apart around the lower portion of the circumference of tubular portion 30. The upper serrations 36 project inwardly and downwardly into the opening through sleeve 28, and the lower serrations 38 project outwardly and upwardly from the outer wall of tubular portion 30. Preferably, each column of serrations 36 or 38 has the same number of serrations, and each serration in a given column is laterally aligned with corresponding serrations in other adjacent columns. Thus, the grooves formed between the adjacent pairs of serrations in a given column are at the same elevations on tubular portion 30 as the grooves in the adjacent columns of serrations.

Coupling assembly 10 also includes a locking member or inner lock ring 40 having a relatively thin circular sleeve portion 42, an upwardly and outwardly inclined rim 44 spanning its upper edge, and a downwardly and outwardly projecting rim 46 spanning its lower edge. A plurality of laterally spaced apart V-shaped notches 48 are formed in upper rim 44 to define upwardly and outwardly projecting fingers 50 at the top of the lock ring. The lock ring is preferably made of aluminum or steel material so that the fingers 50 have a slight resiliency.

Coupling assembly 10 joins the base 12 to the upper end of the standpipe 14 which is coaxially aligned with an opening 52 in the base. Base 12 may represent a vessel, partition, bulkhead, or the drain floor of a tub or shower, for example. Standpipe 14 provides means for carrying away fluids or the like which are channeled to it from above the base 12 through coupling assembly 10. Alternately, standpipe 14 may be replaced by a pipe or hose (not shown) joined to a vessel by coupling assembly 10 for either transferring fluids into or away from the vessel.

The advantage of coupling assembly 10 in the application shown in FIG. 2 is its ability to make a quick coupling between the base 12 and standpipe 14. When the coupling assembly 10 is assembled, the sleeve 28 and outer lock ring 16 may be placed in the position shown in FIG. 2 before the base 12 is permanently joined to standpipe 14. Alternately, if the base 12 is already permanently fixed, the lower lock ring 16 may be mounted below opening 52 so long as standpipe 14 is not yet attached in the position shown in FIG. 2.

The sleeve 28 is then placed in opening 52 so that the lower portion of tubular portion 30 surrounds the upper portion of standpipe 14. Preferably, the upper portion of opening 52 opens into an enlarged annular bore 54 to define an annular bearing surface 56. The flange 32 at the top of sleeve 28 seats against bearing surface 56. When sleeve 28 is mounted in opening 52, an annular space 58 is formed between the inner wall of the sleeve and the outer surface of the standpipe 14. Alternately, if standpipe 14 is replaced by a pipe or hose, the pipe or hose is inserted into the opening through sleeve 28, with an annular space being formed between the inner wall of the sleeve and the outer surface of the pipe or hose.

In use, the outer lock ring 16 is forced upwardly around the depending lower portion of sleeve 28 to clamp the sleeve to base 12. The inner diameter of rim 22 of the outer lock ring is substantially the same as the outside diameter of tubular portion 30 of the sleeve. Thus, the outwardly projecting lower serrations 38 on the sleeve engage the rim 22 of the outer lock ring and prevent the lock ring from being easily slipped over the depending lower portion of the sleeve. The outer lock ring is forced upwardly toward the lower surface of base 12 by a tool (not shown), such as a screwdriver or the like, inserted in the notches 24 surrounding rim 22. By applying an upward force at each of the notches 24 by means of the tool, the resilient fingers 26 of the outer lock ring are progressively engaged between the serrations 38 in a snapping fit. Upward force applied circumferentially to the outer lock ring by the tool forces the lock ring upwardly around the sleeve until the flange 20 on the outer lock ring engages with the lower surface of the base 12.

A flat circular rubber washer 60 having a size which matches the flange 20 may be inserted between the flange and the lower surface of base 12 to make the connection fluid-tight. Alternately, the gasket 60 may be bonded to the underside of flange 20 by a bonding material such as an epoxy type adhesive.

When outer lock ring 16 is engaged with the lower surface of base 12, as shown in FIG. 2, it tightly clamps the sleeve 28 to the base by means of the spring action of the fingers 26 which are tightly engaged in the grooves formed between lower serrations 38. Thus, the sleeve is locked in a rigid position in opening 52.

Coupling assembly 10 also includes a ring-shaped deformable gasket 62 having a wall thickness approximately the same width as the annular space 58 between the sleeve 28 and the standpipe. Preferably, gasket 62 is made of neoprene rubber or similar material, and has a plurality of vertically spaced apart and concentric annular projections 64 formed in its inner wall surface. The gasket is inserted in the lower portion of annular space 58, with the lower portion of the gasket being seated against the bottom rim 34 of sleeve 28.

The inner lock ring 40 is then inserted in annular space 58 above the gasket. The outside diameter of lower rim 46 is slightly less than the inside diameter of the inwardly projecting upper serrations 36 so the rim 46 passes downwardly through annular space 58 past serrations 36 and 38. The outside diameter of upper rim 44 is slightly greater than the inside diameter of the upper serrations 36, so the outer periphery of rim 44 engages the serrations 36 when the inner lock ring is inserted in annular space 58. The inner lock ring is then forced downwardly in annular space 58 by exerting a downward force on it. Preferably, a tool such as a screwdriver is applied to each of the notches 48 and forced down to push the fingers 50 of upper rim 44 progressively down past the upper serrations 36 until the lower rim 46 presses against the upper surface of gasket 62, as shown in FIG. 2. When downward force is applied to the inner lock ring, the spring action of fingers 50 permits the fingers to alternately bend inward slightly to bypass each upper serration and to bend back outward into a snapping fit tightly locked in engagement with the grooves formed between adjacent upper serrations. Sufficient downward force applied to the inner lock ring forces the lower rim 46 against the gasket 62 to squeeze it between the inner wall of the sleeve and the outer surface of the standpipe. In its squeezed condition shown in FIG. 2, the gasket tightly clamps the sleeve to the standpipe, with the inner projections 64 tightly sealed to the standpipe to provide a fluid-tight seal between the sleeve and the standpipe. The inner lock ring permanently maintains gasket 62 in its clamped, fluid-tight position shown in FIG. 2 because the fingers 50 are tightly locked in engagement with the grooves between the adjacent serrations 36.

Thus, a relatively simple coupling is provided in which no screw threaded parts or separate fasteners, such as screws, are used. The coupling is easily and quickly assembled in a rigid, fluid-tight snapping fit. Alternatively, gasket 62 may be bonded to the outer surface of the conduit by a bonding material such as an epoxy type adhesive.

A funnel (shown in phantom lines at 66) may be inserted in the upper portion of the coupling assembly so it rests on the flange 32 at the top of sleeve 28 and extends downwardly into the upper portion of the standpipe. The funnel may be used to provide a neat appearance for the coupling assembly. As shown in FIG. 2, the funnel is also useful in channeling fluid directly into standpipe 14.

The coupling assembly further includes a circular screen 68 sized to fit over the flange 32 at the top of the sleeve. The screen has downwardly extending legs 70 for clamping to the side walls of the sleeve. The screen is inserted in the upper portion of the sleeve so it rests on flange 32, and in use the screen filters the fluid entering the coupling assembly.

Thus, the coupling assembly provides means for quickly and easily joining a base, such as a partion, drain floor, vessel, or the like to a pipe or hose without requiring any mechanical preparation of the pipe or hose (such as threads, welds, or bolts) and without requiring the use of special tools. The coupling has some flexibility which makes it vibration resistant, while at the same time providing a seal against the passage of fluids (liquids, vapor, or gaseous) between the coupling and the pipe or hose.

The coupling assembly also provides a simple means for securing a flange in a fluid-tight relation to a pipe or hose at any location on the pipe or hose. For example, two of the coupling assemblies 10 may be used to join two pipes together. In this application, a flanged sleeve 28 is secured to the end of each pipe by respective inner lock rings 40 and gaskets 62, and bolts or other fastening devices (not shown) are used to secure the flanged portions together.

When the inner lock ring 40 is clamped against gasket 62, strong radial pressure is applied to the outer surface of conduit 14. If conduit 14 is a thin-walled pipe made of a material such as aluminum, or a plastic pipe such as polyvinyl chloride tubing, there is a chance that such pipes would be crushed by the strong clamping pressure of the inner lock ring and gasket. A bushing (not shown) inserted in the pipes reinforces them sufficiently to prevent crushing. Preferably, the bushing is inserted in the pipe in a force fit, with the clamping action of the inner lock ring and gasket holding the bushing tightly in place. Alternatively, the bushing may be bonded to the inside of the pipe.

I claim:

1. Apparatus for coupling to a conduit, the apparatus comprising a tubular member having a wall portion spaced laterally from a surface of the conduit; a deformable gasket in the space between the tubular member and the conduit; one or more separate vertically spaced apart lock receiving serrations formed on the wall portion of the tubular member and projecting toward said surface of the conduit at a point spaced from the gasket; and a locking member vertically slidable in the space between the tubular member and the conduit, the locking member having a projecting shoulder engageable with one or more of the serrations and which deflects to bypass the serrations when the member is slidably forced through said space into contact with the gasket, the shoulder being engageable with one of the bypassed serrations to maintain the locking member in a fixed position so the member exerts a force against the gasket to squeeze the gasket so it forms a fluid-tight seal between said wall portion of the tubular member and the conduit and tightly clamps the tubular member to the conduit.

2. Apparatus according to claim 1 wherein the tubular member is disposed around the outside of the conduit so the space is formed between an inner surface of the tubular member and an outer surface of the conduit; and wherein the lock receiving serrations are formed on the inner surface of the tubular member.

3. The apparatus according to claim 1 wherein the locking member is a sleeve in which the shoulder comprises an outwardly projecting rim spanning an edge of the sleeve, the rim being engageable in a snapping fit between an adjacent pair of said serrations.

4. Apparatus according to claim 2 including a base having an upper surface, a lower surface, and an opening through it; and wherein the tubular member is disposed in the opening, the tubular member having an upper portion communicating with the upper surface of the base, a lower portion extending below the lower surface of the base; and further including means cooperating between the lower surface of the base and the lower portion of the tubular member for clamping the tubular member in a fixed position in the opening.

5. Apparatus according to claim 3 in which the gasket is a ring-shaped member having an annular engaging surface adapted to contact the locking member, and including a second outwardly projecting rim spanning the opposite edge of the sleeve, the second rim being engageable with the annular engaging surface of the gasket.

6. Apparatus according to claim 3 including several radially spaced apart indentations formed in the rim to define several radially spaced apart projecting shoulders engageable with the serrations, the indentations serving as means to enable the locking member to be forced into contact with the gasket.

7. A coupling assembly for joining a base and a conduit, the base having an opening extending between an upper surface and a lower surface thereof, the coupling assembly comprising a tubular member extending through the opening in the base and having a lower portion extending below the lower surface of the base to be fitted around an outer wall of the conduit, the lower portion of the tubular member having an inner wall spaced from the outer wall of the conduit; means for clamping the tubular member in a fixed position in the opening of the base; a deformable gasket in the space between the tubular member and the conduit; one or more separate vertically spaced apart lock receiving serrations formed on the inner wall of the tubular member and projecting toward the outer surface of the conduit at a point spaced from the gasket; and a locking member vertically slidable in the space between the tubular member and the conduit, the locking member having a projecting shoulder engageable with one or more of the serrations and which deflects to bypass the serrations when the member is slidably forced through said space into contact with the gasket, the shoulder being engageable with one of the bypassed serrations to maintain the lock ring member in a fixed position exerting a force against the gasket to squeeze it between the inner wall of the tubular member and the outer wall of the conduit to form a fluid-tight seal between the tubular member and conduit and maintain a firm lock between the tubular member and the conduit.

8. Apparatus according to claim 7 including one or more separate vertically spaced apart serrations formed on the outer surface of the tubular member's lower portion; and wherein the clamping means comprises a sleeve disposed around an outer wall of the lower portion of the tubular member, the sleeve having a flanged portion abutting against the lower surface of the base, and locking means below the flange engaged between an adjacent pair of the serrations in a snapping fit to maintain the sleeve in a fixed position relative to the tubular member and the base.

9. Apparatus according to claim 8 including a seal disposed between the flange and the lower surface of the base.

10. Apparatus according to claim 7 wherein the shoulder of the lock ring comprises radially spaced apart resilient fingers disposed about the circumference of the lock ring.

11. Apparatus according to claim 7 in which there are a plurality of said serrations on the tubular member, and in which the shoulder is engageable between adjacent serrations in a snapping fit.

12. Apparatus according to claim 1 in which there are a plurality of said serrations on the tubular member, and in which the shoulder is engageable between adjacent serrations in a snapping fit.

* * * * *